(12) United States Patent
Fujisaki et al.

(10) Patent No.: US 12,040,521 B2
(45) Date of Patent: Jul. 16, 2024

(54) WAVEGUIDE TUBE CONNECTING MEMBER COMPRISING A FLANGE HAVING A PERIPHERAL SURFACE WITH AN INWARDLY EXTENDING RECESS

(71) Applicant: FURUNO ELECTRIC CO., LTD., Hyogo (JP)

(72) Inventors: Kazuyoshi Fujisaki, Hyogo (JP); Mitsuhiko Hataya, Hyogo (JP)

(73) Assignee: FURUNO ELECTRIC CO., LTD., Hyogo (JP)

( * ) Notice: Subject to any disclaimer, the term of this patent is extended or adjusted under 35 U.S.C. 154(b) by 72 days.

(21) Appl. No.: 17/841,646

(22) Filed: Jun. 15, 2022

(65) Prior Publication Data

US 2023/0043572 A1 Feb. 9, 2023

(30) Foreign Application Priority Data

Aug. 6, 2021 (JP) .................. 2021-129582

(51) Int. Cl.
*H01P 1/04* (2006.01)
*H01P 3/12* (2006.01)

(52) U.S. Cl.
CPC ............... *H01P 1/042* (2013.01); *H01P 3/12* (2013.01)

(58) Field of Classification Search
CPC ..................................... H01P 1/042
USPC ...................................... 333/254
See application file for complete search history.

(56) References Cited

U.S. PATENT DOCUMENTS

| | | | |
|---|---|---|---|
| 2,606,967 | A | 8/1952 | Collard et al. |
| 2011/0156844 | A1 | 6/2011 | Wakabayashi et al. |

FOREIGN PATENT DOCUMENTS

| | | |
|---|---|---|
| JP | S6098901 | 7/1985 |
| JP | S62292001 | 12/1987 |
| JP | 2970565 | 11/1999 |
| JP | 2006080899 | 3/2006 |

OTHER PUBLICATIONS

The Ship's Electric Installation Contractors' Association of Japan, "Technical guidance on electrical equipment on ships, etc." with English translation thereof, The Nippon Foundation Library, 2003, pp. 1-12.

"Search Report of Europe Counterpart Application", issued on Oct. 25, 2022, p. 1-p. 11.

Masahiro Horibe et al., "Modification of waveguide flange design for millimeter and submillimeter-wave measurements," 77th ARFTG Microwave Measurement Conference, Jun. 2011, pp. 1-7.

*Primary Examiner* — Benny T Lee
(74) *Attorney, Agent, or Firm* — JCIPRNET

(57) ABSTRACT

A waveguide tube connecting member includes a first waveguide tube having a first waveguide path and a flange. The flange has a flange end surface extending from a first opening end of the first waveguide path toward an outer side in a tube radial direction, and a second flange outer peripheral surface which is a part of a first flange outer peripheral surface. The second flange outer peripheral surface is a surface formed in a shape in which a part of the flange has a cavity. An electric length from the first opening end of the flange end surface to the second flange outer peripheral surface along the tube radial direction is $(2 \times N+1)/4$ times a wavelength.

20 Claims, 8 Drawing Sheets

WAVEGUIDE TUBE CONNECTING MEMBER COMPRISING A FLANGE HAVING A PERIPHERAL SURFACE WITH AN INWARDLY EXTENDING RECESS

CROSS-REFERENCE TO RELATED APPLICATION

This application claims the priority benefits of Japanese application no. 2021-129582, filed on Aug. 6, 2021. The entirety of the above-mentioned patent application is hereby incorporated by reference herein and made a part of this specification.

BACKGROUND

Technical Field

The disclosure relates to a waveguide tube connecting member for connecting waveguide tubes that transmit a high frequency signal.

A waveguide tube is used as a transmission path for radio waves in a device that uses high frequencies (for example, microwaves) such as a weather radar. When connecting a second waveguide tube to a first waveguide tube, it is necessary to connect the first waveguide tube and the second waveguide tube without any gap. If there is a gap between the first waveguide tube and the second waveguide tube, radio waves may leak from the gap. Patent Literature 1 (Japanese Patent No. 2970565, filed on Dec. 13, 1996) is given as an example of a waveguide tube connecting member. As shown in Patent Literature 1, connection between the waveguide tubes is generally realized by bringing a flange of the first waveguide tube and a flange of the second waveguide tube into contact with each other without any gap, and joining the flanges to each other by fastening the flanges with fasteners such as bolts.

However, the waveguide tube is metal and has tolerances as a mechanical member. Even if all the waveguide tubes that make up the transmission path are to be connected without any gap, there is inevitably a small space due to these tolerance between the waveguide tubes butted against each other and the mating member at any waveguide tube connecting portion in the transmission path. This small space can be reduced by fastening the flanges of the waveguide tubes with fasteners, but it is difficult to completely eliminate the gap.

SUMMARY OF THE INVENTION

The disclosure provides a waveguide tube connecting member capable of suppressing leakage of radio waves even in a state where a waveguide tube and a connecting mating member for the waveguide tube are separated in a tube axial direction due to a tolerance.

The waveguide tube connecting member according to an embodiment of the disclosure includes: a first waveguide tube having a first waveguide path for transmitting a high frequency signal and a flange. The flange has a flange end surface extending from a first opening end of the first waveguide path toward an outer side in a tube radial direction, and a second flange outer peripheral surface which is a part of a first flange outer peripheral surface extending from the flange end surface toward an inner side in a tube axial direction and extending outward in the tube radial direction. The second flange outer peripheral surface is a surface formed in a shape in which a part of the flange end surface in contact with an outer periphery of the flange is recessed toward the inner side in the tube axial direction, or a surface formed in a shape in which a part of the first flange outer peripheral surface of the flange is recessed toward an inner side in the tube radial direction. An electric length from the first opening end of the flange end surface to the second flange outer peripheral surface along the tube radial direction is $(2 \times N+1)/4$ times a free space wavelength $\lambda 0$, and N is an integer of 0 or more.

The flange has an insertion hole for fastening a mating member to which the first waveguide tube is connected, and an outer peripheral surface of the insertion hole on the outer side in the tube radial direction is an outer peripheral surface other than the second flange outer peripheral surface of the first flange outer peripheral surface.

The second flange outer peripheral surface is parallel to an inner peripheral surface of the first waveguide path.

The cavity fully penetrates through the flange parallel to the tube axis of the first waveguide path, and the second flange outer peripheral surface of the second flange is the outermost surface in the tube radial direction.

DETAILED DESCRIPTION OF THE INVENTION

First Embodiment

Figure 1:
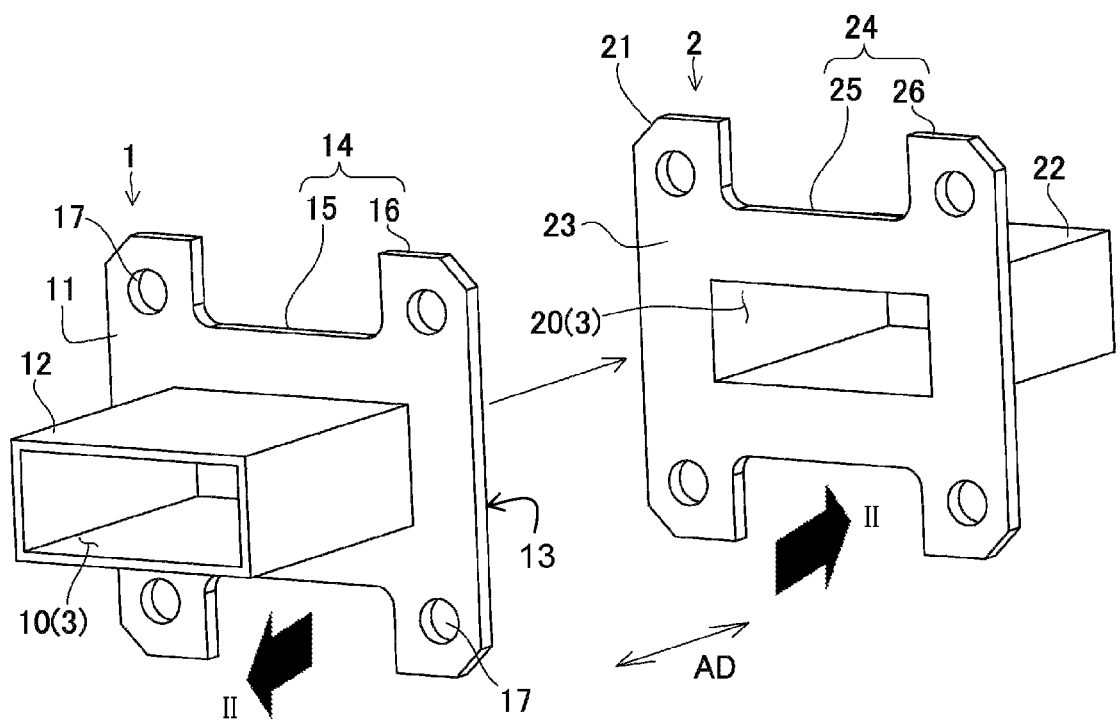
FIG. 1 is a perspective view showing how the first waveguide tube and the second waveguide tube of the first embodiment are butted and fastened with the fastening member.
Figure 1:
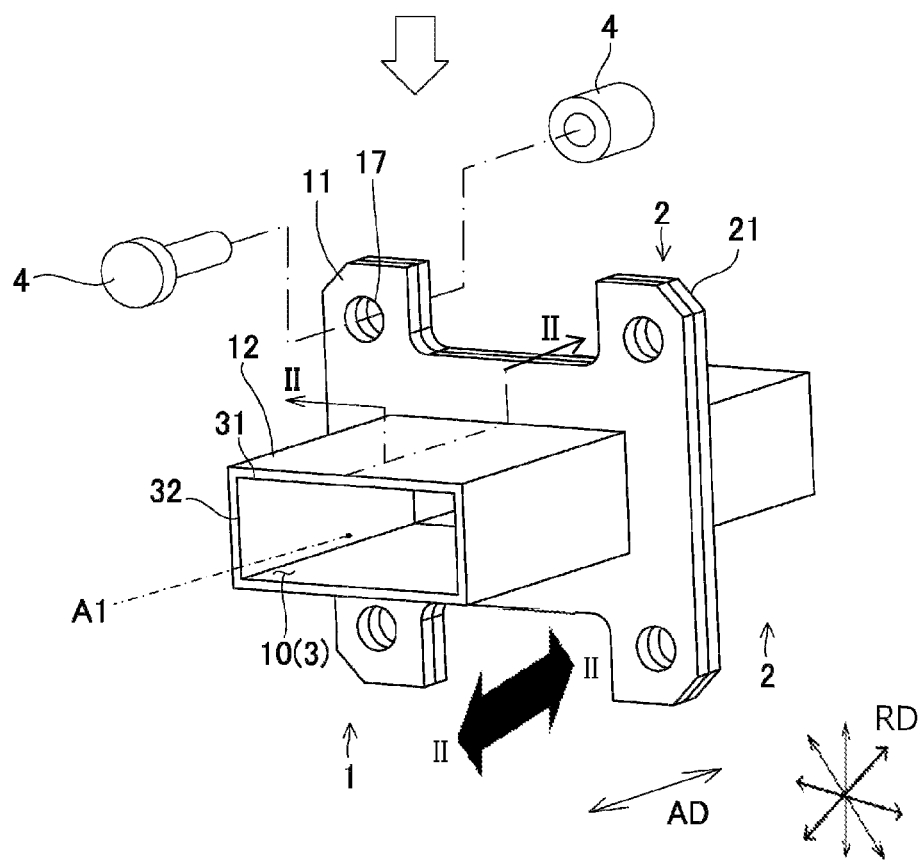
Figure 2:
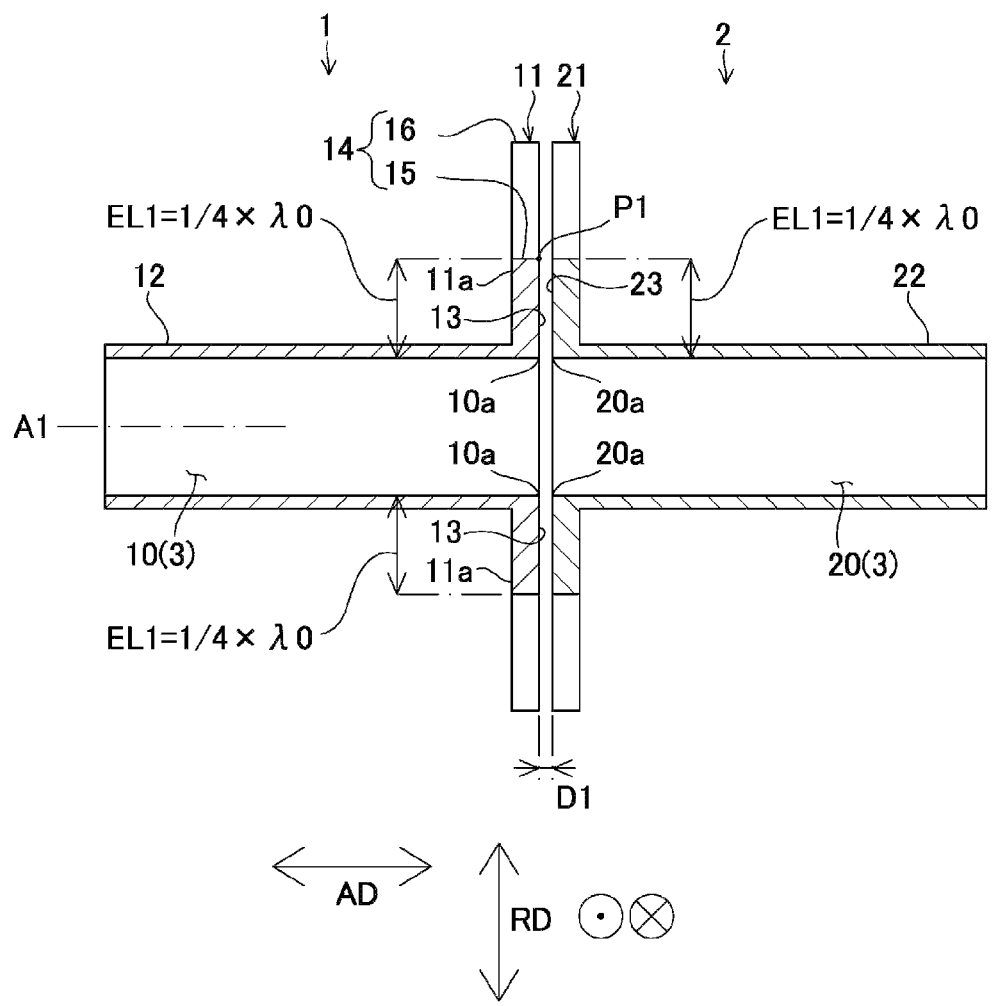
FIG. 2 is a cross-sectional view of the waveguide tube (II-II) of FIG. 1.
Figure 3:
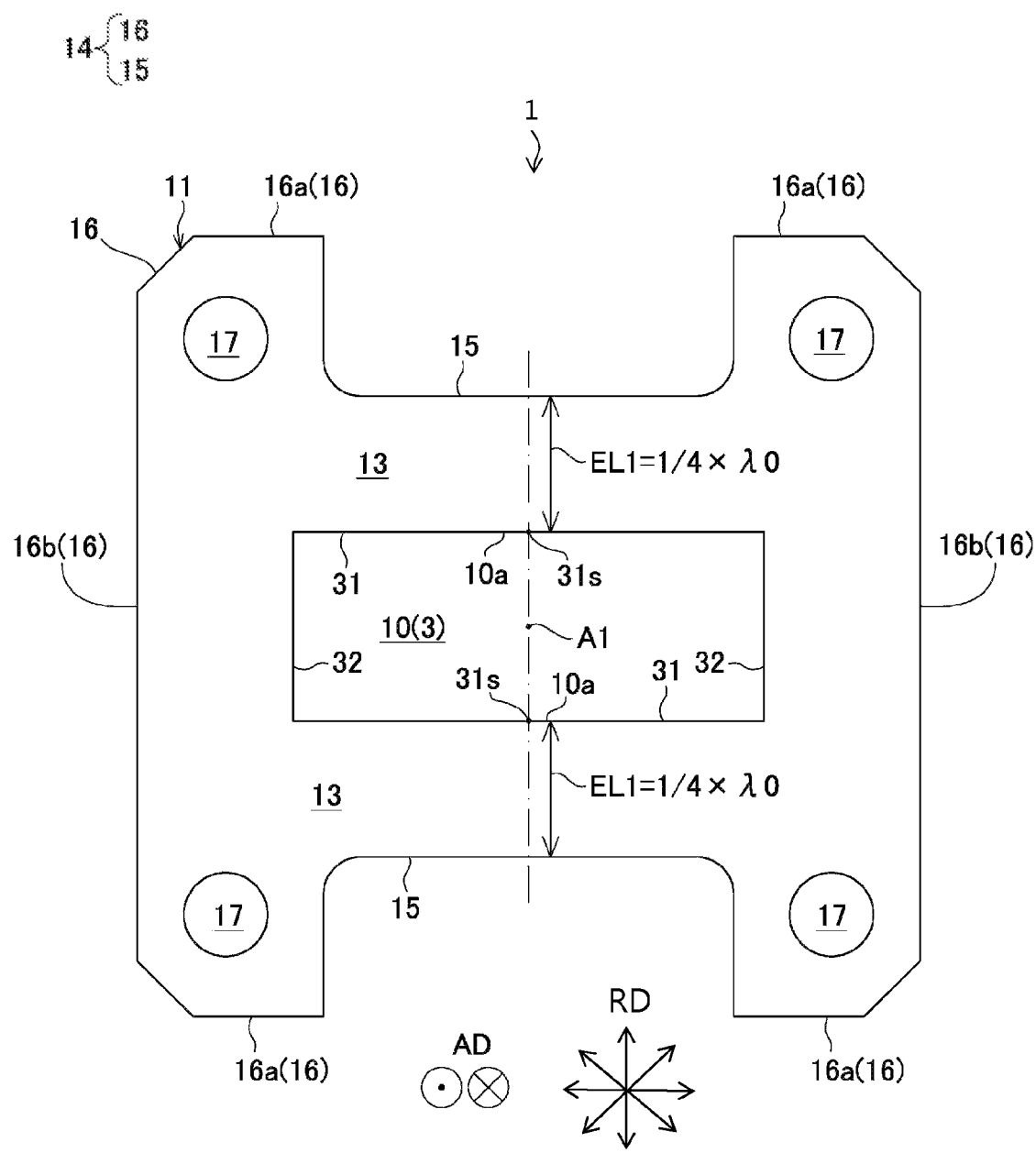
FIG. 3 is a front view of the flange end surface of the first waveguide tube of the first embodiment as viewed from a line of sight parallel to the tube axis.
Figure 4:
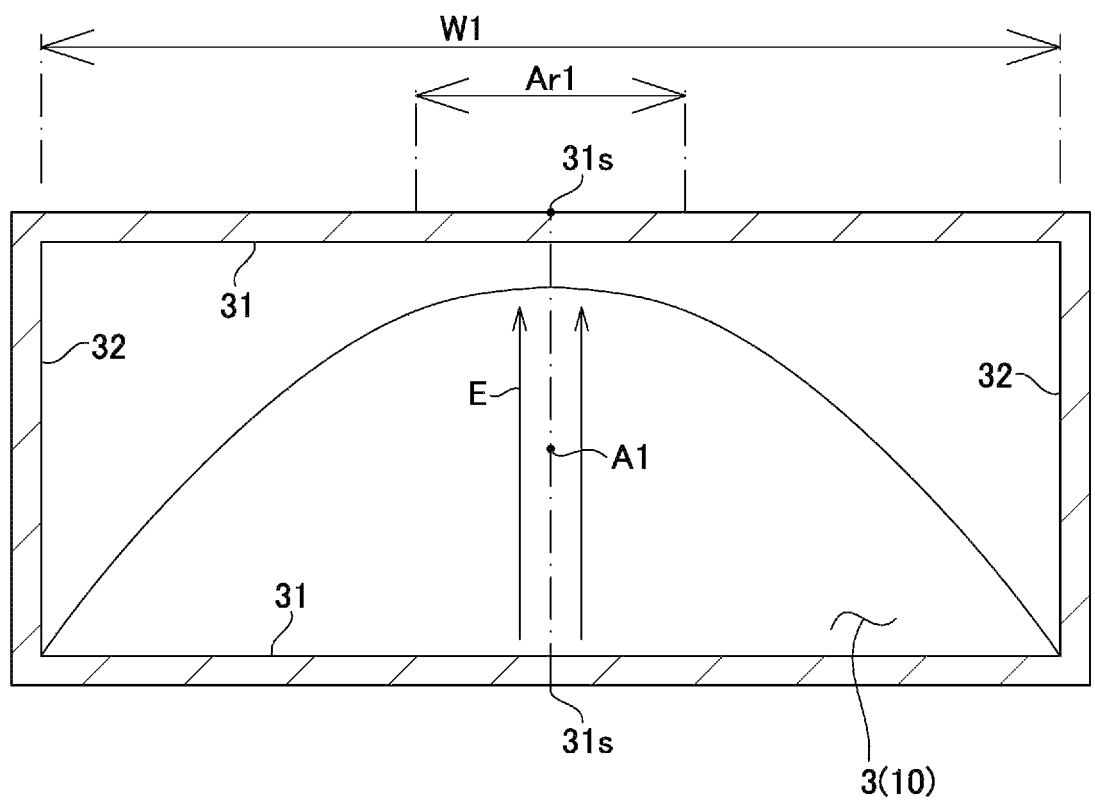
FIG. 4 is a cross-sectional view orthogonal to the tube axis of the rectangular waveguide tube path.

Hereinafter, a waveguide tube connecting member of the first embodiment of the disclosure will be described with reference to the drawings, where like features are denoted by the same reference labels throughout the detail description of the drawings. FIG. 1 is a perspective view showing how a first waveguide tube 1 and a second waveguide tube 2 are butted and fastened with a fastening member 4 such as a bolt. FIG. 2 is a cross-sectional view of a waveguide tube of FIG. 1, and shows a cross section which passes through a tube axis A1 of a first waveguide path 10 and in which a second flange outer peripheral surface 15 appears. In FIG. 2, the first waveguide tube 1 and the second waveguide tube 2 are drawn to be in a state of being separated so as to form a gap for convenience of illustration. FIG. 3 is a front view of a flange end surface 13 of the first waveguide tube 1 as viewed from a line of sight parallel to the tube axis A1. FIG. 4 is a cross-sectional view orthogonal to the tube axis of a rectangular waveguide tube path.

A tube axial direction refers to a direction parallel to the tube axis A1 of an opening (near a first opening end 10a) of the first waveguide tube 1, as shown in FIG. 2. A tube radial direction refers to a direction orthogonal to the tube axis A1 of the opening of the first waveguide tube 1. When the first waveguide tube 1 is bent, the tube axis of the opening on the tip side of the bent portion is used as a reference.

As shown in FIG. 1 to FIG. 3, the waveguide tube connecting member of the first embodiment has the first waveguide tube 1. The first waveguide tube 1 is connected to the second waveguide tube 2. The first waveguide tube 1 has the first waveguide path 10 for transmitting a high frequency signal. The second waveguide tube 2 has a second waveguide path 20 for transmitting a high frequency signal. As shown in FIG. 1 and FIG. 2, the first waveguide tube 1 has a tubular portion 12 forming the first waveguide path 10, and the flange end surface 13 extending toward the outer side in the tube radial direction RD from the first opening end 10a of the first waveguide path 10 at the tip of the tubular portion 12. As shown in FIG. 1 and FIG. 2, the second waveguide tube 2 has a tubular portion 22 forming the second waveguide path 20 for transmitting a high frequency signal, and a second waveguide path end surface 23 extending toward the outer side in the tube radial direction RD from a second opening end 20a of the second waveguide path 20 at the tip of the tubular portion 22. The first waveguide path 10 and the second waveguide path 20 are butted against each other in a connected state. The connected state is a state where the positional relationship between the first waveguide tube 1 and the second waveguide tube 2 is fixed by the fastening member 4 such as a bolt and a nut shown in FIG. 1. In the connected state, the flange end surface 13 of the first waveguide tube 1 and the second waveguide path end surface 23 of the second waveguide tube 2 come into contact with each other without any gap. This is because if there is a gap, radio waves may leak. However, assuming that a gap is formed between the flange end surface 13 of the first waveguide tube 1 and the second waveguide path end surface 23 of the second waveguide tube 2, the means for suppressing or reducing leakage of radio waves will be described below.

The first waveguide tube 1 and the second waveguide tube 2 are hollow metal tubes and are formed of conductors. The first waveguide tube 1 and the second waveguide tube 2 are electrically short-circuited and set to ground. The high frequency signal is transmitted through the first waveguide tube 1 and the second waveguide tube 2 from one side toward the other side in the tube axial direction AD. The high frequency signal referred to in the present specification is a radio wave of 300 MHz or higher, a radio wave of 2 GHz or higher, or a radio wave of 3 GHZ or higher. Further, as the upper limit value, the high frequency signal may be, for example, a radio wave of 50 GHz or lower. For example, the high frequency signal may be a radio wave of 40 GHz or lower. The high frequency signal may be microwaves or millimeter waves. In this embodiment, aluminum or stainless steel is used as the conductor, but the conductor is not limited thereto.

As shown in FIG. 4, the first waveguide path 10 of the first embodiment is a rectangular waveguide tube path 3 having a tube cross section that has long sides 31 and short sides 32. The long sides 31 are parallel to each other, and the short sides 32 are parallel to each other. FIG. 2 is a cross-sectional view of the waveguide tube of FIG. 1. The cross section of the portion II-II, as shown in FIG. 1, is a cross section that passes through a center 31s of the long side 31 and the tube axis A1. An oscillating electric field is generated in the tube path by traveling waves and reflected waves. FIG. 4 is a schematic cross-sectional view orthogonal to the tube axis A1, which is a portion where the oscillating electric field is strong in the tube axial direction AD. As shown in FIG. 4, the oscillating electric field E becomes an antinode at the portion connecting the centers 31s of the long sides 31, and becomes the most dominant in terms of intensity. On the other hand, the oscillating electric field E is not generated on the short side 32. The high frequency signal is transmitted in the rectangular waveguide tube path 3 in a TE10 mode (Transverse Electric Mode), which is the basic mode of the rectangular waveguide tube path 3. In the TE10 mode, the electric field is not generated in the direction parallel to the long side 31, but is generated in the direction parallel to the short side 32. In a mode other than the basic mode (TE10 mode), the mode is not limited thereto, and it is possible to use other modes than the TE10 mode.

As shown in FIG. 1 to FIG. 3, the first waveguide tube 1 has a flange 11 formed at the tip of the tubular portion 12. The flange 11 has the flange end surface 13 extending toward the outer side in the tube radial direction RD from the first opening end 10a of the first waveguide path 10, and the second flange outer peripheral surface 15 which is a part of a first flange outer peripheral surface 14 extending toward the inner side in the tube axial direction AD from the flange end surface 13 and opened to the outer side in the tube radial direction RD. In the first embodiment, the second flange outer peripheral surface 15 is a surface formed in a shape in which a part of the first flange outer peripheral surface 14 is recessed toward the inner side in the tube radial direction RD.

Specifically, as shown in FIG. 3, the first flange outer peripheral surface 14 of the flange 11 includes the second flange outer peripheral surface 15 and a third flange outer peripheral surface 16 at the outermost end in the tube radial direction RD. The third flange outer peripheral surface 16 has a surface 16a parallel to the long side 31 of the rectangular waveguide tube path 3, and a surface 16b parallel to the short side 32 of the rectangular waveguide tube path 3. A part of the surface 16a parallel to the long side 31 of the rectangular waveguide tube path 3 is recessed toward the inner side in the tube radial direction, by which the second flange outer peripheral surface 15 is formed. The second flange outer peripheral surface 15 is arranged on the outer side in the tube radial direction RD with respect to the long side 31 of the rectangular waveguide tube path 3. In the cross section (FIG. 2) which passes through the tube axis A1 of the first waveguide path 10 and in which the second flange outer peripheral surface 15 appears, the second flange outer peripheral surface 15 extends from the flange end surface 13 to a tube axial direction inner end 11a of the flange 11. In the cross section (FIG. 2), the second flange outer peripheral surface 15 is a surface on the outermost side in the tube radial direction. That is, the recess extending toward the inner side in the tube radial direction in a part of the first flange outer peripheral surface 14 of the flange 11 reaches the entirety in the tube axial direction, and a part of the first flange outer peripheral surface 14 as viewed from a line of sight parallel to the tube axis A1 is in a cut-out state.

On the other hand, no recess is formed on the surface 16b parallel to the short side 32 of the rectangular waveguide tube path 3, and the surface 16b does not have the second flange outer peripheral surface 15. The reason why the surface 16b parallel to the short side 32 of the rectangular waveguide tube path 3 does not have the second flange outer peripheral surface 15 which is a recess is that the radio waves leaking through the tube axis A1 and the center 31s of the long side 31 and through the portion parallel to the short side 32 and perpendicular to the long side 31 (the portion shown by the one-dot chain line in FIG. 3) are dominant in terms of intensity.

As shown in FIG. 2 and FIG. 3, in order to reduce or prevent leakage of radio waves, the electric length EL1 from the first opening end 10a (FIG. 2) of the flange end surface 13 to the second flange outer peripheral surface 15 along the tube radial direction RD is ¼ times a free space wavelength λ0. In the first embodiment, the electric length EL1 is ¼ times the free space wavelength λ0, but the electric length EL1 is not limited thereto as long as the oscillating electric field E can be made a node (short) at the first opening end 10a. For example, in the case of (3λ0/4) and (5λ0/4), the electric length EL1 can be set to (2×N+1)/4 times the free space wavelength λ0. N is an integer of 0 or more, and examples of the value that N can take are 0, 1, 2, 3, 4, 5 . . . . According to this configuration, even if a gap is formed between the flange end surface 13 of the first waveguide tube 1 and the second waveguide path end surface 23 of the second waveguide tube 2, this gap is opened to the outer side in the tube radial direction, and the length of the gap in the tube radial direction is the electric length EL1. Then, the oscillating electric field E generated in this gap can be made an antinode (open) on the second flange outer peripheral surface 15 and can be made a node (short) at the first opening end 10a. As a result, even if a gap is formed between the first waveguide tube 1 and the second waveguide tube 2, it is possible to suppress leakage of the dominant (most) radio waves toward the outer side in the tube radial direction.

As shown in FIG. 3, the flange 11 has an insertion hole 17 for passing the fastening member 4 such as a bolt to be fastened to the mating member (second waveguide tube 2) connected to the first waveguide tube 1. The outer peripheral surface on the outer side of the tube radial direction that corresponds to the insertion hole 17 is an outer peripheral surface (third flange outer peripheral surface 16) of the flange 11 that is distinct or different from the second flange outer peripheral surface 15 of the first flange outer peripheral surface 14. The third flange outer peripheral surface 16 is farther from the tube axis A1 than the second flange outer peripheral surface 15. That is, the second flange outer peripheral surface 15 is formed by a recess while leaving the insertion hole 17 through which the fastening member 4 such as a bolt passes. The spacing between each respective position of the insertion holes 17 is determined by the industry standard or manufacturer's specifications. In the first embodiment, as shown in FIG. 3, the insertion hole 17 is arranged so as not to overlap the long side 31 when the insertion hole 17 is projected in a direction orthogonal to the long side 31 of the first waveguide path 10. The second flange outer peripheral surface 15 may be arranged by providing a recess in a portion of the flange 11 that overlaps the long side 31 as viewed from a line of sight parallel to the direction orthogonal to the long side 31 of the first waveguide path 10.

As shown in FIG. 2 and FIG. 3, in the first embodiment, a corner P1 separating the flange end surface 13 and the second flange outer peripheral surface 15 is parallel to the inner peripheral surface (long side 31) of the first waveguide path 10. That is, the second flange outer peripheral surface 15 whose length from the inner peripheral surface (long side 31) of the first waveguide path 10 is the electric length EL1 extends in the tube circumferential direction. Accordingly, it is possible to enhance the effect of suppressing leakage of radio waves. In the first embodiment, the second flange outer peripheral surface 15 formed by a recess is arranged linearly respectively along a pair of long sides 31 of the rectangular waveguide tube path 3. The second flange outer peripheral surfaces 15 are arranged at positions sandwiching the first waveguide path 10 in the cross section in which the pair of long sides 31 appear. As shown in FIG. 4, since the space between the centers 31s of the long sides 31 is the most dominant in terms of intensity, the pair of second flange outer peripheral surfaces 15 may sandwich the centers 31s of the long sides 31. Specifically, the second flange outer peripheral surfaces 15 may be arranged at positions centering on the centers 31s of the long sides 31 and sandwiching the region Ar1, which is 24% of the maximum width W1 of the long side 31, from at least the outer side in the tube radial direction. This is because 60% of the electric power is distributed in this 24% region Ar1. Further, the second flange outer peripheral surfaces 15 may be arranged at positions centering on the centers 31s of the long sides 31 and sandwiching the region Ar1, which is 36% of the maximum width W1 of the long side 31, from at least the outer side in the tube radial direction. This is because 81% of the electric power is distributed in this 36% region Ar1.

In the first embodiment, the first waveguide tube 1 is connected to the second waveguide tube 2. Similar to the first waveguide tube, the second waveguide tube 2, as shown in FIG. 2, has the second waveguide path 20 butted against the first waveguide path 10 of the first waveguide tube 1, and a flange 21 extending toward the outer side in the tube radial direction RD from the second opening end 20a of the second waveguide path 20 and fastened to the flange end surface 13 of the first waveguide path 10. That is, both the first waveguide tube 1 and the second waveguide tube 2 are flanged waveguide tubes. Similar to the first waveguide tube 1, the flange 21 of the second waveguide tube 2 has a recess formed on the first flange outer peripheral surface 24 and the second flange outer peripheral surface 25 is formed by the recess, and the first flange outer peripheral surface 24 has the second flange outer peripheral surface 25 and the third flange outer peripheral surface 26, as shown in FIG. 1. The electric length along the tube radial direction RD from the second opening end 20a to the second flange outer peripheral surface 25 on the second waveguide path end surface 23 is (2×N+1)/4 times the free space wavelength λ0. Since the recess (second flange outer peripheral surfaces 15, 25) forming the electric length is formed in both the first waveguide tube 1 and the second waveguide tube 2, it is possible to enhance the effect of suppressing leakage of radio waves as compared with the case where the recess is formed in only one flange.

The distance D1 between the flange end surface 13 of the first waveguide tube 1 and the second waveguide path end surface 23, which is exemplified in FIG. 2, may be 0.0 mm. However, the effect of suppressing leakage of radio waves is maintained even if the distance D1 exceeds 1.0 mm due to the cumulative value of the tolerances of a plurality of mechanical parts constituting the transmission path. That is, as the acceptable value of the tolerances of the mechanical parts is increased, the flexibility in the mechanical design of the waveguide tube is improved, and since a gap can be tolerated, the assembly work becomes easy.

OTHER EMBODIMENTS (1) In the first embodiment shown in FIG. 1 to FIG. 4, as shown in FIG. 3, the second flange outer peripheral surface 15 is formed by a rectangular recess as viewed from a line of sight parallel to the tube axis A1, and the second flange outer peripheral surface 15 has a linear shape parallel to the inner peripheral surface (long side 31) of the rectangular waveguide tube path 3, but the disclosure is not limited thereto. For example, in the second embodiment shown in FIG. 5, the second flange outer peripheral surface 15 is formed by an arc-shaped recess as viewed from a line of sight parallel to the tube axis A1, and the second flange outer peripheral surface 15 satisfying the electric length EL1 is narrower in the tube circumferential direction than that in FIG. 3.

(2) In the first embodiment shown in FIG. 1 to FIG. 4, the flange 21 of the second waveguide tube 2 is formed with a recess to form the second flange outer peripheral surface 25, but the flange 21 of the second waveguide tube 2 may not have a recess. It suffices if the first waveguide tube 1 alone can set the electric length from the first opening end 10a to the second flange outer peripheral surface 15 to the above value.

Figure 6:
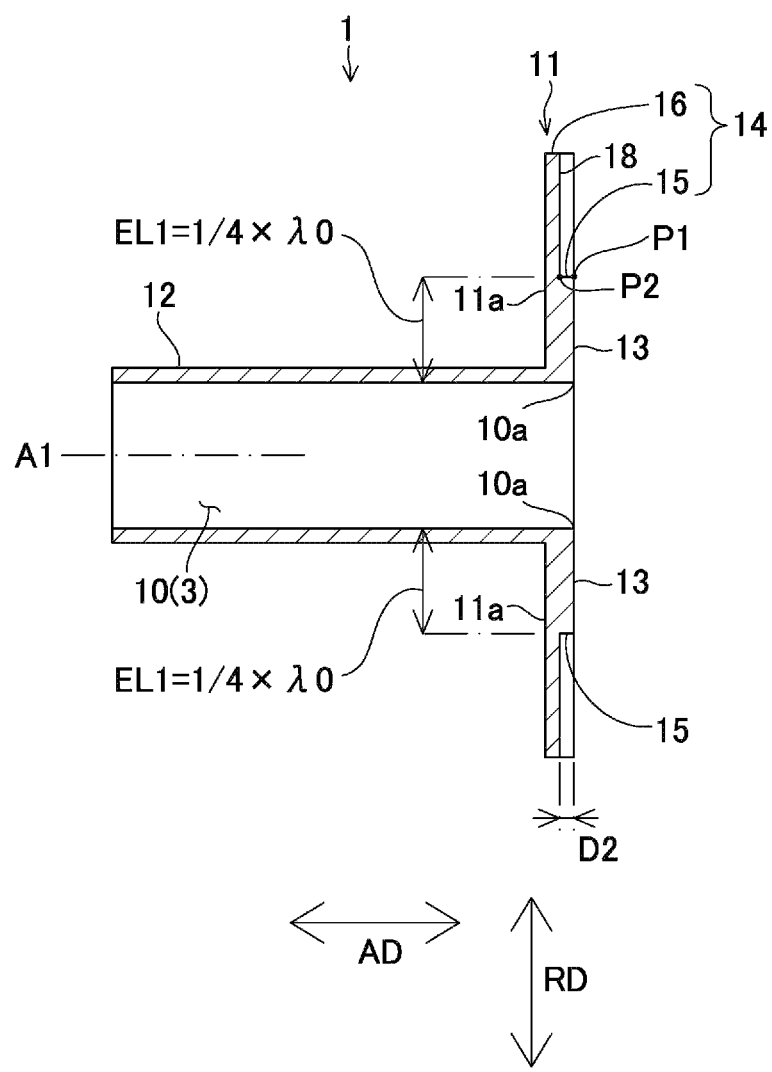
FIG. 6 is a cross-sectional view of the first waveguide tube of the third embodiment.

(3) In the first embodiment shown in FIG. 2, the recess of the flange 11 of the first waveguide tube 1 extends entirely in the tube axial direction from the flange end surface 13 to the tube axial direction inner end 11a of the flange 11, but the disclosure is not limited thereto. For example, in the third embodiment shown in FIG. 6, the recess of the flange 11 of the first waveguide tube 1 extends from the flange end surface 13 toward the inner side in the tube axial direction of the flange 11, but does not reach the tube axial direction inner end 11a. As shown in FIG. 6, the second flange outer peripheral surface 15 is a surface formed in a shape in which a part of the flange end surface 13 in contact with the outer periphery of the flange 11 is recessed toward the inner side in the tube axial direction AD. In the cross section shown in FIG. 6, which passes through the tube axis A1 of the first waveguide path 10 and in which the second flange outer peripheral surface 15 appears, the flange 11 has a radial direction extending surface 18 extending from the tube axial direction inner end P2 of the second flange outer peripheral surface 15, which extends from the flange end surface 13 toward the inner side in the tube axial direction AD, toward the outer side in the tube radial direction RD. The flange end surface 13, the second flange outer peripheral surface 15, and the radial direction extending surface 18 form a step. As described above, even if a part of the flange 11 cannot be completely formed into a recessed shape in the tube axial direction AD, it is still possible to form the second flange outer peripheral surface 15 and to suppress the leakage of radio waves. The length D2 from the flange end surface 13 to the radial direction extending surface 18 (the tube axial direction inner end P2 of the second flange outer peripheral surface 15) in the tube axial direction may be 2.0 mm or more, or may be 5.0 mm or more if the frequency is around 9.5 GHZ.

Figure 5:
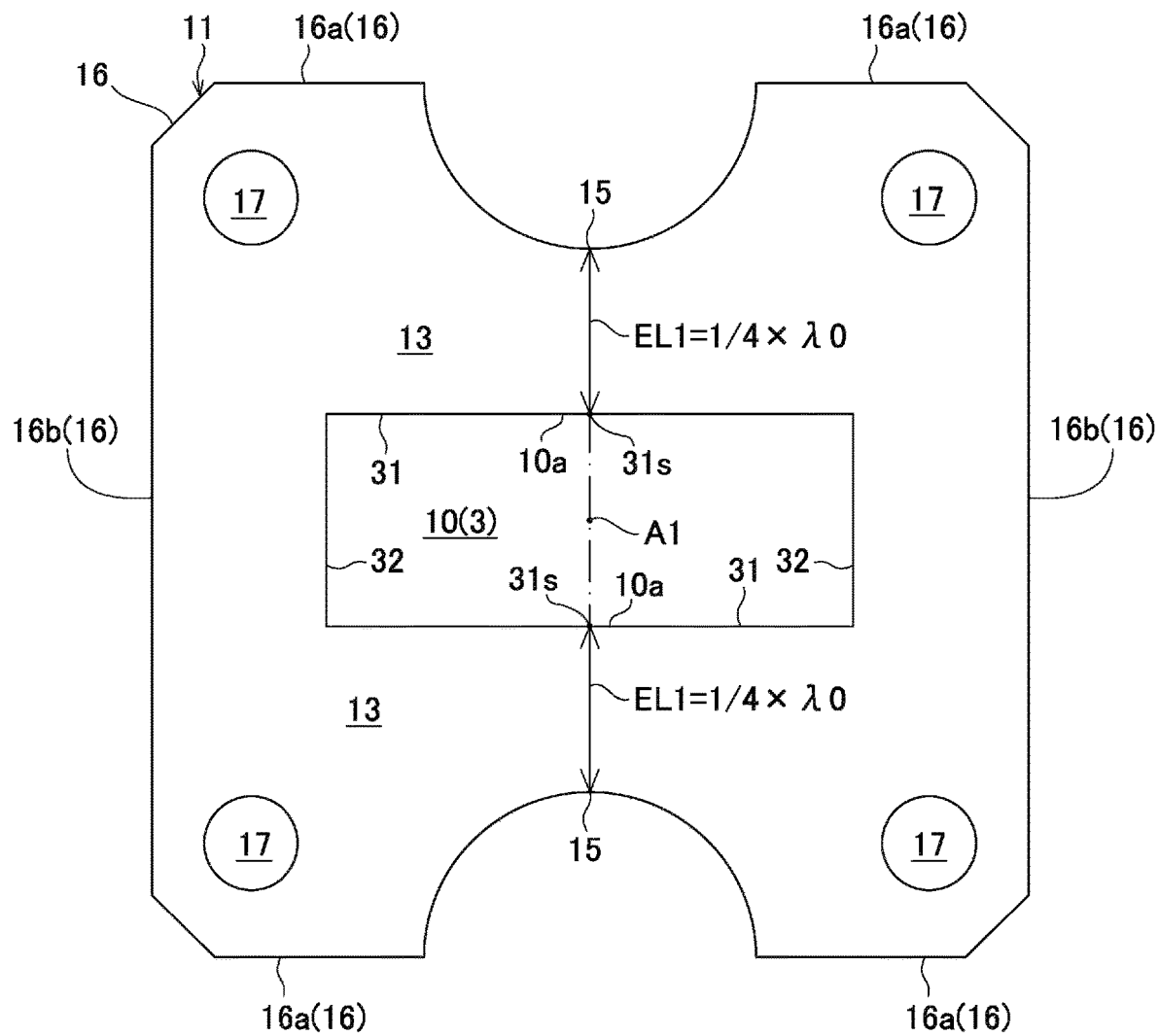
FIG. 5 is a front view of the flange end surface of the first waveguide tube of the second embodiment as viewed from a line of sight parallel to the tube axis.
Figure 7:
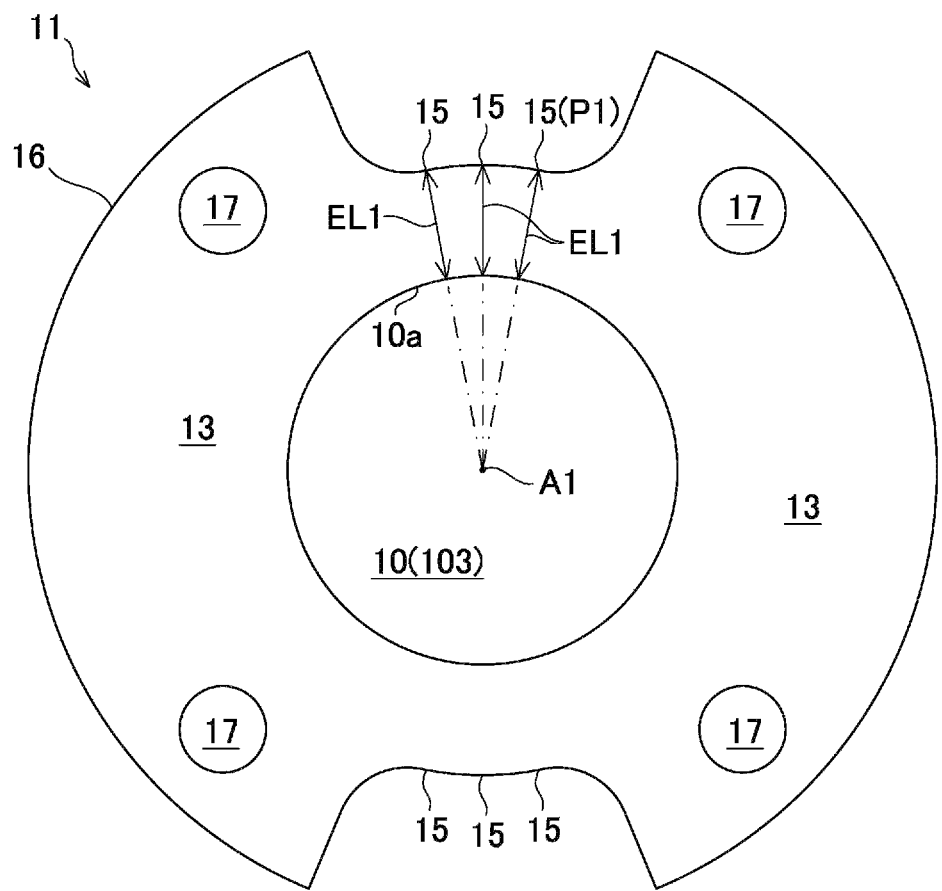
FIG. 7 is a front view of the flange end surface of the first waveguide tube of the fourth embodiment as viewed from a line of sight parallel to the tube axis.

(4) In the first embodiment, the tube path is the rectangular waveguide tube path 3 having a tube cross section that has the long sides 31 and the short sides 32, but the disclosure is not limited thereto. For example, as in the fourth embodiment shown in FIG. 7, the first waveguide path 10 of the first waveguide tube may be a circular waveguide tube path 103 that has a circular tube cross section. The second flange outer peripheral surface 15 formed by a recess or a step is arranged at a position that is axisymmetric with the tube axis A1 of the first waveguide path 10 as the axis of symmetry. In the example shown in FIG. 7, the corner P1 separating the flange end surface 13 and the second flange outer peripheral surface 15 is parallel to the inner peripheral surface of the first waveguide path 10, and is formed in an arc shape parallel to the arc-shaped inner peripheral surface of the first waveguide path 10 as viewed from a line of sight parallel to the tube axis A1. Of course, as shown in FIG. 5, the corner P1 may not be parallel to the inner peripheral surface of the first waveguide path 10.

Figure 8:
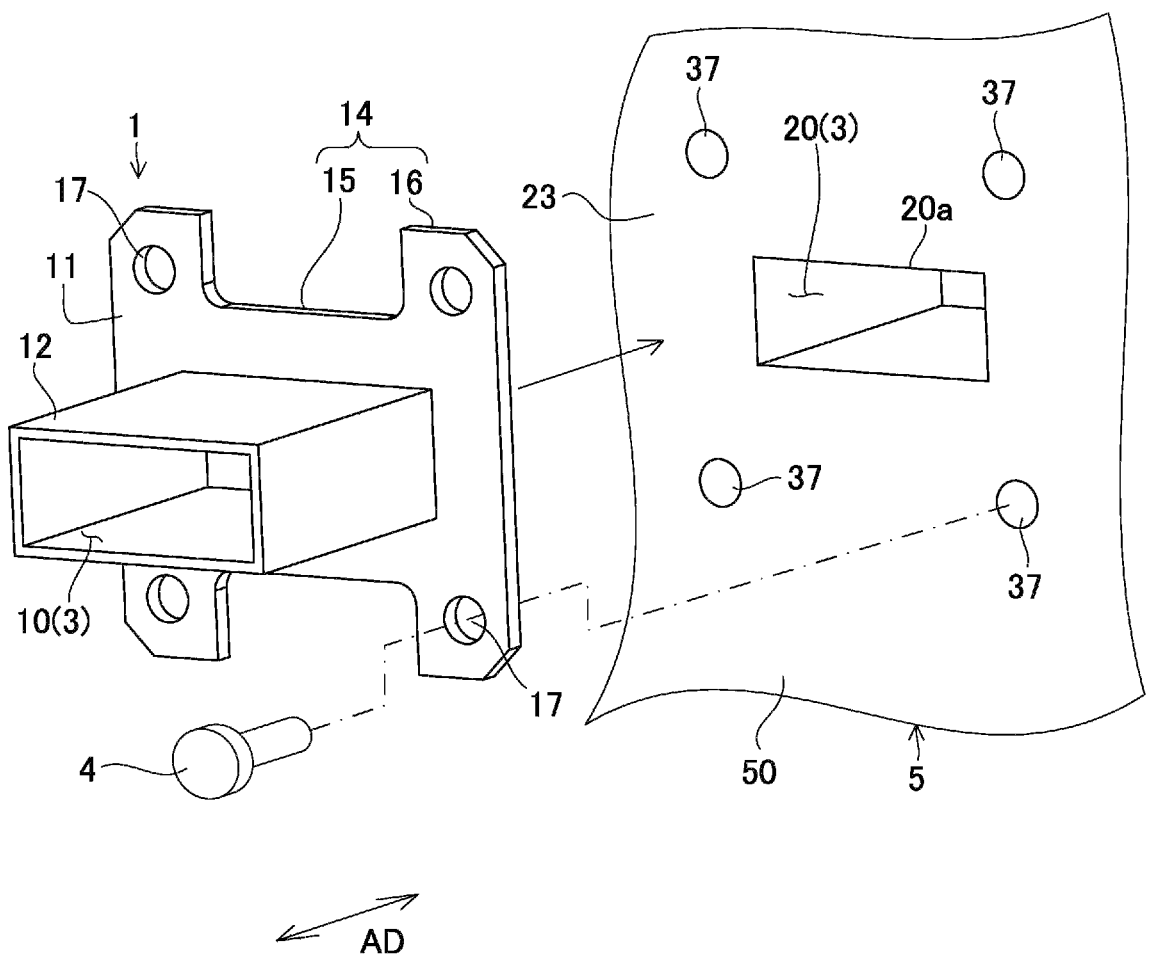
FIG. 8 is a perspective view showing how the first waveguide tube of the fifth embodiment is butted against the mating member and fastened with the fastening member.

(5) In the first embodiment shown in FIG. 1, the mating member to which the first waveguide tube 1 is connected is the second waveguide tube, but the mating member is not necessarily a waveguide tube. For example, as in the fifth embodiment shown in FIG. 8, the mating member 5 may be an object other than a tube such as a housing of a device. As shown in FIG. 8, the mating member 5 includes a housing 50 having the second waveguide path 20 butted against the first waveguide path 10 of the first waveguide tube 1, and the second waveguide path end surface 23 extending from the second opening end 20a of the second waveguide path 20 in the housing 50 toward the outer side in the tube radial direction of the first waveguide tube 1. The housing 50 has a fastening hole 37 such as a screw hole or a bolt hole for fixing the fastening member that passes through the insertion hole 17 of the first waveguide tube 1. The second waveguide path end surface 23 of the mating member 5, which corresponds to the surface of the second waveguide tube shown in FIG. 1, is wider in the tube radial direction than the flange 11 of the first waveguide tube 1. Even in such a connection form, the second flange outer peripheral surface 15 is formed, so that the electric length EL1 of the gap, which corresponds to the electric length EL1 of the first waveguide tube shown in FIG. 2, in the tube radial direction that can be formed between the flange end surface 13 and the second waveguide path end surface 23 is $(2 \times N+1)/4$ times the free space wavelength $\lambda 0$. Therefore, it is possible to effectively suppress leakage of radio waves.

(6) As in the first to fifth embodiments, the second flange outer peripheral surface 15 extends toward the inner side in the tube axial direction in parallel to the tube axial direction from the tube radial direction outer end (P1) of the flange end surface 13, but the disclosure is not limited thereto. For example, the second flange outer peripheral surface 15 may extend toward the inner side in the tube axial direction while being inclined with respect to the tube axial direction from the tube radial direction outer end (P1) of the flange end surface 13.

As described above, like the waveguide tube connecting members of the first to fifth embodiments, the first waveguide tube 1 having the first waveguide path 10 for transmitting a high frequency signal and the flange 11 may be provided, and the flange 11 may have the flange end surface 13 extending from the first opening end 10a of the first waveguide path 10 toward the outer side in the tube radial direction RD, and the second flange outer peripheral surface 15 which is a part of the first flange outer peripheral surface 14 extending from the flange end surface 13 toward the inner side in the tube axial direction AD and released to the outer side in the tube radial direction RD. The second flange outer peripheral surface may be a surface formed in a shape in which a part of the flange end surface 13 in contact with the outer periphery of the flange is recessed (has a cavity) toward the inner side in the tube axial direction AD, or a surface formed in a shape in which a part of the first flange outer peripheral surface of the flange 11 is recessed (has a cavity) toward the inner side in the tube radial direction RD. The electric length from the first opening end 10a of the flange end surface 13 to the second flange outer peripheral surface 15 along the tube radial direction RD may be $(2 \times N+1)/4$ times the free space wavelength $\lambda 0$, and N may be an integer of 0 or more.

When connecting the flange of the first waveguide tube 1 to the second waveguide tube 2 or the mating member 5 with the fastening member 4 such as a bolt, the second waveguide path end surface 23 of the second waveguide tube 2 or the mating member 5 and the flange end surface 13 are to be disposed in contact with each other without any gap formed therebetween, but a gap may be formed. Nevertheless, according to this configuration, even if a gap is formed between the flange end surface 13 and the second waveguide path end surface 23, the second flange outer peripheral surface 15 is opened to the outer side in the tube radial direction RD, so that this gap is opened to the outer side in the tube radial direction RD and the length of the gap in the tube radial direction RD is determined by the electric length. If the electric length along the tube radial direction RD of the gap that is opened in the tube radial direction RD is set to $(2 \times N+1)/4$ times the free space wavelength $\lambda 0$ such as $(\lambda 0/4)$, $(3\lambda 0/4)$, $(5\lambda 0/4)$, etc., the oscillating electric field E generated in this gap can be made an antinode (open) on the second flange outer peripheral surface 15, and can be made a node (short) at the first opening end 10a. As a result of the oscillating electric field E becoming a node (short) at the first opening end 10a, it is possible to suppress leakage of radio waves toward the outer side in the tube radial direction RD even if a gap is formed.

Although not particularly limited, like the waveguide tube connecting members of the first to fifth embodiments, the flange 11 may have the insertion hole 17 for passing the fastening member 4 to be fastened to the mating member [second waveguide tube 2, mating member 5], to which the first waveguide tube 1 is connected. The outer peripheral surface of the insertion hole 17 on the outer side in the tube radial direction RD may be an outer peripheral surface (third flange outer peripheral surface 16) other than the second flange outer peripheral surface 15 of the first flange outer peripheral surface 14. According to this configuration, since the second flange outer peripheral surface is formed by a recess while leaving the insertion hole 17 through which the fastening member 4 such as a bolt passes, it is possible to suppress leakage of radio waves with the second flange outer peripheral surface 15 while ensuring the connection compatibility of the fastening member 4 with other members and the rigidity of the flange 11.

Although not particularly limited, like the waveguide tube connecting members of the first to fifth embodiments, the corner P1 separating the flange end surface 13 and the second flange outer peripheral surface 15 may be parallel to the inner peripheral surface of the first waveguide path 10 as viewed from a line of sight parallel to the tube axis A1 of the first waveguide path 10. According to this configuration, since the portion where the electric length EL1 from the inner peripheral surface (first opening end 10a) of the first waveguide path 10 to the second flange outer peripheral surface 15 is $(2 \times N+1)/4$ of the free space wavelength $\lambda 0$ extends and spreads in the tube circumferential direction, it is possible to further suppress or prevent leakage of radio waves.

Although not particularly limited, like the waveguide tube connecting members of the first, second, fourth, and fifth embodiments, in the cross section (FIG. 2) which passes through the tube axis A1 of the first waveguide path 10 and in which the second flange outer peripheral surface 15 appears, the second flange outer peripheral surface 15 may extend from the flange end surface 13 to the tube axial direction inner end 11a of the flange end surface 13, and in the cross section, the second flange outer peripheral surface 15 may be the outermost surface in the tube radial direction RD. According to this configuration, since the second flange outer peripheral surface 15 is the outermost surface in the tube radial direction RD in the cross section, the entire flange 11 is cut out along the tube axial direction AD. Since the gap that can be formed between the flange end surface 13 and the second waveguide path end surface 23 becomes a space completely opened in the tube radial direction RD, it is possible to further suppress or prevent leakage of radio waves.

Although not particularly limited, like the waveguide tube connecting member of the third embodiment, in the cross section which passes through the tube axis A1 of the first waveguide path 10 and in which the second flange outer peripheral surface 15 appears, the flange 11 may have the radial direction extending surface 18 extending from the inner end in the tube axial direction AD of the second flange outer peripheral surface 15, which extends from the flange end surface 13 toward the inner side in the tube axial direction AD, toward the outer side in the tube radial direction RD. The flange end surface 13, the second flange outer peripheral surface 15, and the radial direction extending surface 18 may form a step. According to this configuration, the second flange outer peripheral surface 15 can be formed by forming the step. Since the flange 11 has the portion that is not cut out on the inner side in the tube axial direction AD with respect to the radial direction extending surface 18, even if the flange 11 cannot be completely cut out, the electric length EL1 in the tube radial direction RD of the gap that can be formed between the flange end surface 13 and the second waveguide path end surface 23 can be set to $(2 \times N+1)/4$ of the free space wavelength $\lambda 0$, and it is possible to suppress or prevent leakage of radio waves.

Although not particularly limited, like the waveguide tube connecting members of the first to third embodiments, the first waveguide path 10 may be the rectangular waveguide tube path 3 having a tube cross section that has the long sides 31 and the short sides 32, and the second flange outer peripheral surface 15 may be arranged on the outer side of the long side 31 in the tube radial direction RD. According to this configuration, it is possible to appropriately suppress leakage of a high frequency signal in the rectangular waveguide tube path 3.

Although not particularly limited, like the waveguide tube connecting member of the fourth embodiment, the first waveguide path 10 may be the circular waveguide tube path 103 that has a circular tube cross section, and the second flange outer peripheral surface 15 may be arranged at a position that is axisymmetric with the tube axis A1 of the first waveguide path 10 as the axis of symmetry. According to this configuration, since the circular waveguide tube path 103 has the largest electric field along an arbitrary radial direction RD passing through the tube axis A1, it is possible to appropriately suppress leakage of a high frequency signal.

Although not particularly limited, like the waveguide tube connecting members of the first to fourth embodiments, the second waveguide tube 2 may be further provided, and the second waveguide tube 2 may have the second waveguide path 20 butted against the first waveguide path 10 of the first waveguide tube 1, and the flange 21 extending from the second opening end 20a of the second waveguide path 20 toward the outer side in the tube radial direction RD and fastened to the flange end surface 13 of the first waveguide tube 1. In this way, it is applicable to fasten the flange 11 of the first waveguide tube 1 and the flange 21 of the second waveguide tube 2.

Although not particularly limited, like the waveguide tube connecting member of the fifth embodiment, the mating member 5 to which the first waveguide tube 1 is connected may be further provided, and the mating member 5 may have the second waveguide path butted against the first waveguide path 10 of the first waveguide tube 1, and the second waveguide path end surface 23 extending from the second opening end 20a of the second waveguide path 20 toward the outer side in the tube radial direction RD. The second waveguide path end surface 23 of the mating member 5 may be wider in the tube radial direction RD than the flange 11 of the first waveguide tube 1. In this way, it is applicable to fasten the flange 11 of the first waveguide tube 1 to a member larger than the flange 11 of the first waveguide tube 1, for example, the mating member 5 such as a housing of a device.

Although the embodiments of the disclosure have been described above with reference to the drawings, it should be considered that the specific configuration is not limited to these embodiments. The scope of the disclosure is set forth not only by the description of the embodiments above but also by the scope of the claims, and further includes all modifications within the meaning and scope equivalent to the scope of the claims.

It is possible to adopt the structure adopted in each of the above embodiments in any other embodiment.

The specific configuration of each part is not limited to the embodiments described above, and various modifications can be made without departing from the gist of the disclosure.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface". The term "vertical" refers to a direction perpendicular to the horizontal as just defined. Terms such as "above." "below," "bottom," "top." "side." "higher." "lower." "upper." "over." and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately", "about", and "substantially" as used herein include the recited numbers, and also represent an amount close to the stated amount that still performs a desired function or achieves a desired result. For example, the terms "approximately", "about", and "substantially" may refer to an amount that is within less than 10% of the stated amount. Features of embodiments disclosed herein preceded by a term such as "approximately", "about", and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A waveguide tube connecting member, comprising:
   a first waveguide tube comprising a first waveguide path for transmitting a high frequency signal and including a flange,
   wherein the flange has a flange end surface extending from a first opening end of the first waveguide tube toward an outer side in a tube radial direction, and a second flange outer peripheral surface which is a part of a first flange outer peripheral surface extending from the flange end surface toward an inner side in a tube axial direction and extending outward in the tube radial direction,
   the second flange outer peripheral surface is a surface formed in a shape in which a part of the flange end surface in contact with an outer periphery of the flange has a recess toward the inner side in the tube axial direction, or a surface formed in a shape in which a part of the first flange outer peripheral surface of the flange has a recess toward an inner side in the tube radial direction, and
   an electric length from the first opening end of the flange end surface to the second flange outer peripheral surface along the tube radial direction is $(2 \times N+1)/4$ times a free space wavelength $\lambda 0$, wherein N is an integer of 0 or more.

2. The waveguide tube connecting member according to claim 1, wherein the flange has an insertion hole for fastening a mating waveguide to which the first waveguide tube is connected, and
   the flange includes an outer peripheral surface on the outer side of the tube radial direction that corresponds to the insertion hole, the outer peripheral surface of the flange being distinct from the second flange outer peripheral surface of the first flange outer peripheral surface.

3. The waveguide tube connecting member according to claim 2, wherein the first waveguide path is a rectangular waveguide tube path having a tube cross section that has a long side and a short side, and
   the second flange outer peripheral surface is arranged on an outer side of the long side in the tube radial direction.

4. The waveguide tube connecting member according to claim 2, wherein the second flange outer peripheral surface is parallel to an inner peripheral surface of the first waveguide tube as being viewed along a direction of a tube axis of the first waveguide path.

5. The waveguide tube connecting member according to claim 2, wherein the recess forms a step on the flange end surface partially penetrating through the flange, and
   an outer peripheral surface of the step corresponds to the second flange outer peripheral surface.

6. The waveguide tube connecting member according to claim 2, wherein the recess fully penetrates through the flange parallel to the tube axis of the first waveguide path, and
   the second flange outer peripheral surface is the outermost surface in the tube radial direction.

7. The waveguide tube connecting member according to claim 2, wherein the first waveguide path is a circular waveguide tube path having a circular tube cross section, and
   the second flange outer peripheral surface is arranged at a position that is symmetric with respect to a center point of the circular tube cross section.

8. The waveguide tube connecting member according to claim 1, wherein the recess forms a step on the flange end surface partially penetrating through the flange, and
   an outer peripheral surface of the step corresponds to the second flange outer peripheral surface.

9. The waveguide tube connecting member according to claim 8, wherein the first waveguide path is a rectangular waveguide tube path having a tube cross section that has a long side and a short side, and
   the second flange outer peripheral surface is arranged on an outer side of the long side in the tube radial direction.

10. The waveguide tube connecting member according to claim 1, wherein the recess fully penetrates through the flange parallel to the tube axis of the first waveguide path, and
    the second flange outer peripheral surface is the outermost surface in the tube radial direction.

11. The waveguide tube connecting member according to claim 10, wherein the first waveguide path is a rectangular waveguide tube path having a tube cross section that has a long side and a short side, and
the second flange outer peripheral surface is arranged on an outer side of the long side in the tube radial direction.

12. The waveguide tube connecting member according to claim 1, wherein the second flange outer peripheral surface is parallel to an inner peripheral surface of the first waveguide tube as being viewed along a direction of a tube axis of the first waveguide path.

13. The waveguide tube connecting member according to claim 12, wherein the first waveguide path is a rectangular waveguide tube path having a tube cross section that has a long side and a short side, and
the second flange outer peripheral surface is arranged on an outer side of the long side in the tube radial direction.

14. The waveguide tube connecting member according to claim 12, wherein the recess forms a step on the flange end surface partially penetrating through the flange, and
an outer peripheral surface of the step corresponds to the second flange outer peripheral surface.

15. The waveguide tube connecting member according to claim 12, wherein the recess fully penetrates through the flange parallel to the tube axis of the first waveguide path, and
the second flange outer peripheral surface is the outermost surface in the tube radial direction.

16. The waveguide tube connecting member according to claim 12, wherein the first waveguide path is a circular waveguide tube path having a circular tube cross section, and
the second flange outer peripheral surface is arranged at a position that is symmetric with respect to a center point of the circular tube cross section.

17. The waveguide tube connecting member according to claim 1, wherein the first waveguide path is a rectangular waveguide tube path having a tube cross section that has a long side and a short side, and
the second flange outer peripheral surface is arranged on an outer side of the long side in the tube radial direction.

18. The waveguide tube connecting member according to claim 1, wherein the first waveguide path is a circular waveguide tube path having a circular tube cross section, and
the second flange outer peripheral surface is arranged at a position that is symmetric with respect to a center point of the circular tube cross section.

19. The waveguide tube connecting member according to claim 1, further comprising a second waveguide tube,
wherein the second waveguide tube comprises:
a second waveguide path butted against the first waveguide path of the first waveguide tube; and
a second waveguide tube flange extending from a second opening end of the second waveguide tube toward the outer side in the tube radial direction and fastened to the flange end surface of the first waveguide tube.

20. The waveguide tube connecting member according to claim 1, further comprising a mating waveguide connected to the first waveguide tube,
wherein the mating waveguide comprises:
a second waveguide tube butted against the first waveguide tube; and
a second waveguide end surface extending from a second opening end of the second waveguide tube toward the outer side in the tube radial direction,
wherein the second waveguide end surface of the mating waveguide is wider in the tube radial direction than the flange of the first waveguide tube.

* * * * *